United States Patent [19]

Tuzee

[11] 4,071,176
[45] Jan. 31, 1978

[54] CAR TOP SKI AND SKI-GEAR CARRIER

[76] Inventor: John Tuzee, 2729 Jacquelyn Lane, Waukegan, Ill. 60085

[21] Appl. No.: 657,169

[22] Filed: Feb. 11, 1976

[51] Int. Cl.² ............................................. B60R 9/04
[52] U.S. Cl. ........................... 224/42.1 E; 211/60 SK; 224/29 R
[58] Field of Search ............... 224/1 B, 29 R, 42.1 R, 224/42.1 D, 42.1 E, 42.1 G, 42.03 A, 45 S, 42.42 R; 211/60 SK, 4, 64; 206/315, 217; 280/11.37 A, 11.37 K

[56] References Cited

U.S. PATENT DOCUMENTS

| 1,502,180 | 7/1924 | Dever | 224/42.42 R |
|---|---|---|---|
| 2,106,503 | 1/1938 | Hendrick | 211/60 SK X |
| 2,234,487 | 3/1941 | Davis | 224/45 S X |
| 2,519,662 | 8/1950 | Kempken | 206/317 |
| 3,006,519 | 10/1961 | Doane | 224/42.1 E |
| 3,378,182 | 4/1968 | McMiller | 224/42.1 G X |
| 3,889,861 | 6/1975 | Fihn | 280/11.37 A X |
| 3,892,343 | 7/1975 | Warner | 224/45 S |
| 3,915,362 | 10/1975 | Hart | 224/42.1 E |
| 3,917,137 | 11/1975 | Wilkins | 224/42.1 E X |

FOREIGN PATENT DOCUMENTS

| 1,945,167 | 4/1971 | Germany | 224/42.1 E |
|---|---|---|---|
| 2,024,368 | 2/1972 | Germany | 224/42.1 E |

OTHER PUBLICATIONS

Mechanix Illustrated, p. 89, Jan. 1973.

Primary Examiner—Robert J. Spar
Assistant Examiner—Winston H. Douglas
Attorney, Agent, or Firm—Edmond T. Patnaude

[57] ABSTRACT

A ski carrier includes a rigid enclosure for luggage and for partially enclosing a plurality of skis, the skis being held in place by upwardly swinging hinged doors mounted on opposite sides of the enclosure over access openings therein.

7 Claims, 4 Drawing Figures

U.S. Patent   Jan. 31, 1978   4,071,176

CAR TOP SKI AND SKI-GEAR CARRIER

The present invention broadly relates to ski carriers of the type adapted to be mounted on automotive vehicles, and it relates in particular to a new and improved carrier for carrying skis and other articles such as boots, poles, and luggage on the exterior of an automobile or the like.

BACKGROUND OF THE INVENTION

Because of their length, it has been most convenient, if not necessary, to carry skis on the outside of an automobile when travelling to and from the ski areas, and various types of racks or carriers have been designed for that purpose. A common feature of the prior art ski carriers has been the fact that the skis are exposed to the elements unless covered with a tarpaulin or the like. Moreover, the use of prior art ski carriers has generally precluded the use of other auxilliary luggage carriers thus necessitating that other luggage be carried in the vehicle where space is frequently at a premium.

SUMMARY OF THE INVENTION

Briefly, there is provided in accordance with the teachings of the present invention a new and improved ski carrier adapted to be mounted to a vehicle. The carrier provides an enclosed storage space for ski boots, poles, and other luggage and further incorporates means for carrying a plurality of pairs of skis. In this carrier, the skis are positioned over the access opening or openings to the storage space, and one or more doors, lockably mounted over the openings, prevent unauthorized removal of the skis and access to the storage space. The bindings of the skis are also covered by the door so as to be protected from the elements while in the carrier.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
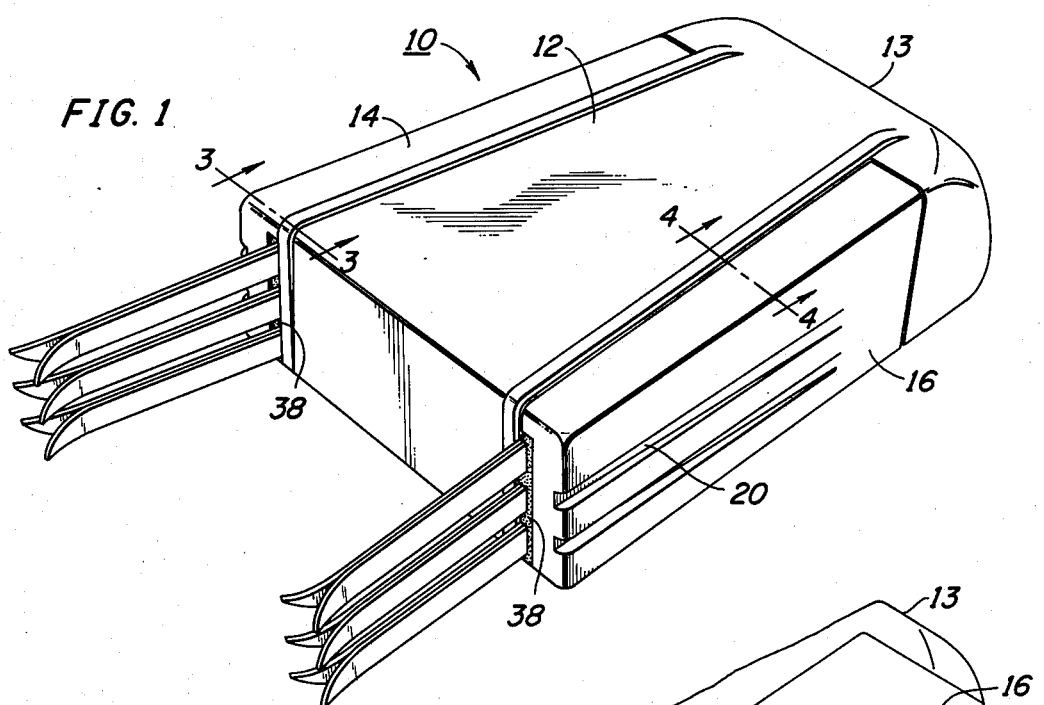
FIG. 1 is a perspective view of a ski carrier embodying the present invention, which view shows a plurality of pairs of skis in place in the carrier.

Referring now to the drawing and particularly to FIG. 1 thereof, a car top ski carrier embodying the present invention includes a main housing member 12 formed of a rigid material such, for example, as linear polyethylene, and is provided with a streamlined forward end 13 with elongated horizontal access openings in the opposite sides. These openings are adapted to be closed by means of a pair of doors 14 and 16. The housing 12 includes a deck 15 and is completely hollow so as to provide storage space for ski boots, ski poles and other luggage therein, and has a streamlined exterior to minimize wind resistance and so as to be easily cleaned. Four suction cup feet 18 (FIGS. 3 and 4) are provided on the bottom of the body 12 for mounting the carrier to a vehicle. Additional straps, clamps or the like may be used if necessary or desirable to secure the carrier in place. For a more permanent mount the body 12 may be bolted to the vehicle.

Figure 2:
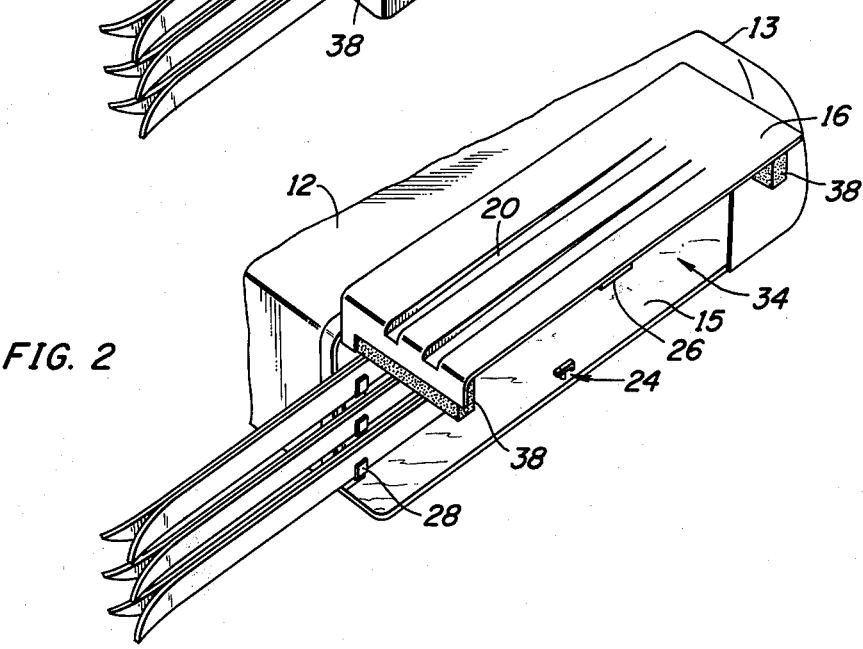
FIG. 2 is a fragmentary view of the carrier of FIG. 1 showing one of the doors in an open position.

The doors 14 and 16 may also be molded of a suitable rigid plastic material such as linear polyethylene and include a plurality of horizontally disposed strengthening grooves 20. A plurality of hinges 22 connect the tops of each of the doors 14 and 16 to the carrier body 12 so as to permit the doors to be swung upwardly into the open position as shown in FIG. 2. Preferably the hinges 22 include torson springs which hold the doors in the raised positions after they have been opened. Key operated locks 24 are mounted to the bottom deck 15 of the body 12 on each side thereof for lockably engaging respective latch members 26 on the door near the bottom thereof. The locks 24 preferably, but not necessarily, are each operated by a key which is inserted into the lock from the bottom. With the door in the open, raised position as shown in FIG. 2, luggage and the like may be placed in or removed from the main body of the carrier.

Figure 3:
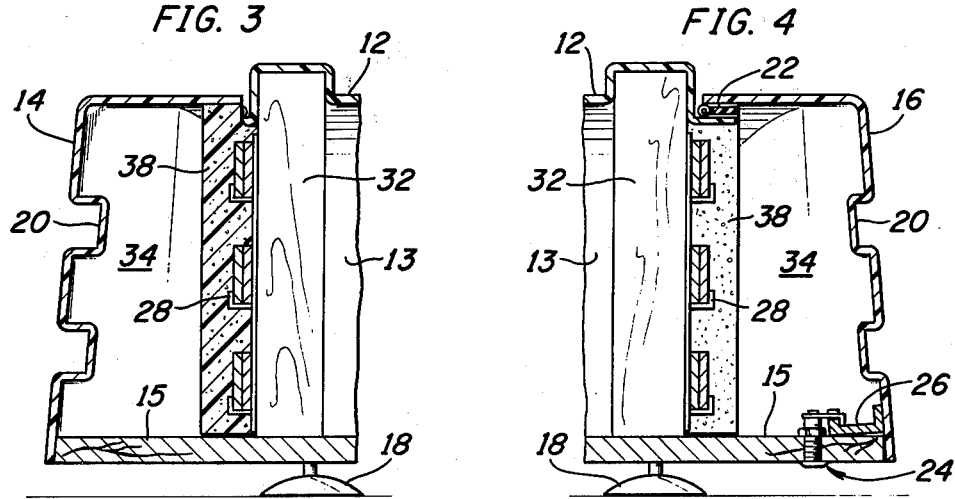
FIG. 3 is a vertical sectional view taken along the line of 3—3 of FIG. 1.
Figure 4:
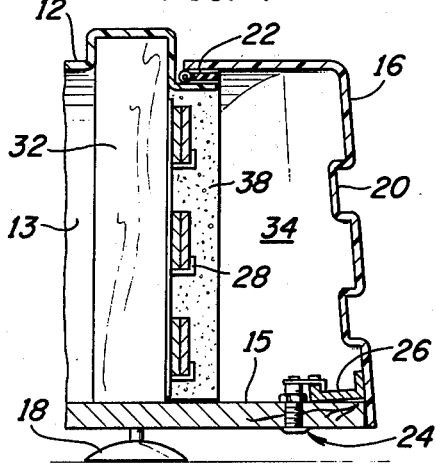
FIG. 4 is a vertical sectonal view taken along the line 4—4 of FIG. 1.

A plurality of hook-like ski support brackets 28 are mounted to the body 12 just rearward of the access opening therein but forwardly of the rear edge of the body, and a plurality of brackets 28 are mounted on a vertical support member 32 at the front of the access opening. The brackets 28 are sufficiently wide to support a pair of skis arranged in bottom to bottom relationship thereon as shown in FIGS. 2, 3 and 4. The bindings on the skis may be left assembled to the skis while the skis are in the carrier inasmuch as the doors 14 and 16 define relatively large spaces 34 and 36 therein exteriorly of the access openings in the carrier body.

In order to seal the interior of the carrier from the elements and also to prevent the skis from bouncing on the brackets 28, the doors 14 and 16 are provided at the front and the rear with resilient members 38 suitably formed of a polyurethane foam or the like. When the doors 14 and 16 are in the closed position as shown in FIGS. 1, 3 and 4, the members 38 are compressed against and around the adjacent portions of the skis to compress the skis against the carrier body to prevent spurious movement thereof during travel of the vehicle. The resilient members 38 also functon as sealing gaskets.

When the doors 14 and 16 are closed and locked unauthorized access to the skis and to the storage space in the carrier is prevented. Moreover, the storage space, as well as the central and rearward portions of the skis are protected from the elements.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A streamlined carrier for skis and other articles comprising
  a rigid housing having interior storage space for said articles,
  said housing having a streamlined forward end wall, a rear end wall, opposite side walls disposed at the forward end only of said housing, and top and bottom walls, said top wall being generally T-shaped, having a longitudinal leg portion extending rearwardy from a transverse cross portion disposed at the forward end of said housing adjacent said side walls, said housing having side openings for permitting access to said space extending rearwardly from said side walls to said rear end wall, means for mounting said housing to the exterior of a vehicle with said forward end disposed toward the front of said vehicle, means mounted to said housing for supporting a plurality of skis across said openings with one end portion of each of said skis extending into the forward portion of said interior storage space beneath said transverse cross portion of said top wall and with the other end portions of skis extending rearwardly from said carrier adjacent said rear wall, a pair of doors respectively mounted to said housing over said openings said doors each having a side wall portion, an upper wall portion and a rear wall portion, said upper and rear wall portions of each of said doors extending transversely of the side wall portion of each of said doors and being a part of the same contour of the respective adjacent portions of said top and rear walls of said housing when said door is closed, said side wall portion of each of said doors being a part of the same contour of the respective side wall of said housing when said door is closed, whereby said door prevents access to said storage space, prevents removal of said skis, and protects all but said other end portons of said skis from the elements.

2. A carrier according to claim 1 wherein said means for supporting a plurality of skis comprises
a plurality of ledges on which said skis are adapted to rest.

3. A carrier according to claim 1 comprising
compressible resilient means carried by said door for sealably engaging said skis and said enclosure.

4. A carrier according to claim 3 comprising
hinge means for mounting said door to said closure for swinging movement about an axis substantially parallel to said skis.

5. A carrier according to claim 4 wherein
said axis is horizontal and above said skis when said carrier is mounted on the top of an automobile.

6. A carrier according to claim 5 comprising
key operated lock means for locking said door in a closed position.

7. A carrier according to claim 5 comprising
means for latching said door in a closed position.

* * * * *